United States Patent [19]

Malz, Jr. et al.

[11] 3,867,443

[45] Feb. 18, 1975

[54] NUCLEAR HYDROGENATION OF N-ARYL POLYAMIDES

[75] Inventors: Russell E. Malz, Jr., Naugatuck; Harold Greenfield, Watertown, both of Conn.

[73] Assignee: Uniroyal, Inc., New York, N.Y.

[22] Filed: Feb. 22, 1972

[21] Appl. No.: 228,355

[52] U.S. Cl. ...... 260/561 R, 260/404.5, 260/471 R, 260/518 R, 260/557 R, 252/413
[51] Int. Cl. .......................................... C07c 103/30
[58] Field of Search ......... 260/561 R, 404.5, 557 R; 252/413

[56] References Cited
UNITED STATES PATENTS

| | | | |
|---|---|---|---|
| 2,447,361 | 8/1948 | Peck et al. | 260/557 R |
| 2,704,281 | 3/1955 | Appell | 252/413 |
| 2,788,363 | 4/1957 | Anner et al. | 260/557 R X |
| 3,578,395 | 5/1971 | Kluksdahl et al. | 252/413 X |
| 3,591,635 | 7/1971 | Farrissey et al. | 252/413 X |

OTHER PUBLICATIONS

Freifelder, "Practical Catalytic Hydrogenation," Wiley Interscience, New York, 1971, p. 501.

*Primary Examiner*—Lewis Gotts
*Assistant Examiner*—Ethel G. Love
*Attorney, Agent, or Firm*—James J. Long

[57] ABSTRACT

N-Alicyclic polyamides are prepared by nuclear hydrogenation of N-aryl polyamides using a metal catalyst. For example bis(4-acetamidophenyl)methane is hydrogenated to bis(4-acetamidocyclohexyl)methane using a rhodium catalyst. Treatment of the catalyst with acid increases its effectiveness; spent catalyst is reactivated by treatment with acid (e.g., sulfuric or acetic acid). The acid-treated catalyst is also useful for nuclear hydrogenation of N-aryl monoamides.

9 Claims, No Drawings

NUCLEAR HYDROGENATION OF N-ARYL POLYAMIDES

This invention relates to a method for the nuclear hydrogenation of N-aryl polyamides to N-alicyclic polyamides using rhodium, ruthenium, palladium, osmium, iridium, nickel or cobalt as a catalyst and to a method of enhancing the utility of such catalyst by treatment with acid.

U.S Pat. No. 3,228,975, Abraham et al., Jan. 11, 1966, teaches the hydrogenation of 4-n-octylacetanilide (which is an N-aryl monoamide) to N-acetyl-4-n-octylcyclohexylamine using rhodium catalyst. This teaching is not suggestive of the hydrogenation of N-aryl polyamides as in the present invention because it is well known that polyfunctional materials behave differently from monofunctional materials, and present entirely different problems. There is ample documentation of the unpredictable effect of two or more substituents as compared to the influence of a single substituent. Freifelder has stated ("Practical Catalytic Hydrogenation", Wiley-Interscience, New York, 1971, p. 558) that "Despite the usefulness of rhodium for low-pressure reductions of anilines . . . . . it is generally ineffective for hydrogenations of benzenoid compounds containing several amino groups."Smith("Catalysis", Vol. 5, page 212) has said what "While reduction of simple aromatic monoamines takes place readily, . . . . . more complex amines may be difficult to reduce."

The nuclear hydrogenation of N-aryl polyamides to N-alicyclic polyamides in accordance with the invention is the key step in an efficient route for the conversion of aromatic polyamines to alicyclic polyamines by the sequence of reactions consisting of acylation of the aromatic polyamine to an N-aryl polyamide, nuclear hydrogenation of the N-aryl polyamide to an N-alicyclic polyamide, and hydrolysis of the N-alicyclic polyamide to an alicyclic polyamine. This route is superior to the previously used nuclear hydrogenation of aromatic polyamines to alicyclic polyamines. It is particularly valuable for the preparation of alicyclic diamines, which are useful as monomers for polyamide high polymers (e.g., nylons), for conversion to non-discoloring diisocyanates to be used in polyurethane manufacture, as epoxy curing agents, and as chemical intermediates.

The preparation of alicyclic diamines by the sequence of acylation of the aromatic diamine, nuclear hydrogenation of the N-aryl amide, and hydrolysis of the N-alicyclic amide to the alicyclic diamine is a very high yield method, and unexpectedly results in a product of highly improved purity.

In contrast, the direct hydrogenation of even simple aromatic amines, such as aniline, is accompanied by significant side reactions and leads to products containing impurities that are often difficult and costly to remove. There are coupling reactions to form secondary amines, hydrogenolysis of the carbon-nitrogen bond to form ammonia, and hydrolysis to ketones in the presence of water. In addition, these by-products can sometimes severely inhibit the catalyst, resulting in long cycle times and excessive catalyst costs. These complications are considerably more troublesome with polyamines than with monamines. Such difficulties can be avoided by first suitably blocking the primary amino groups by acylation, then conducting the nuclear hydrogenation in accordance with the invention, and finally restoring the free amino groups in the alicyclic product by hydrolysis.

N-ARYL POLYAMIDES TO BE HYDROGENATED

Any N-aryl polyamide may be employed in the invention, including for example those of the following formulas I and II.

Formula I:

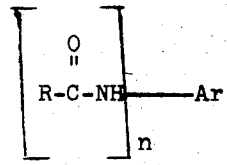

In Formula I, $n$ is an integer having a value such as from 2 to 4 (preferably 2). R is a moiety such as hydrogen, an alkyl group of from 1 to 17 carbon atoms, a cycloalkyl group of from 5 to 8 carbon atoms, an aryl group of from 6 to 10 carbon atoms, an aralkyl or alkaryl group of from 7 to 14 carbon atoms, or the like (alkyl being preferred, whether lower alkyl such as methyl, ethyl, propyl, isopropyl, n-, sec-, iso- and tert-butyl, or higher alkyl such as stearyl). Ar is for example an aromatic group having from 6 to 18 carbon atoms, containing up to 4 fused rings, frequently phenylene, tolylene, or naphthylene (and may if desired include various substituents such as alkyl $C_1$–$C_{18}$, cycloalkyl $C_5$–$C_8$, phenyl, naphthyl, alkaryl or aralkyl $C_7$–$C_{15}$, alkoxy $C_1$–$C_{18}$, cycloalkoxy $C_5$–$C_8$, phenoxy, benzoxy, alkanoyl $C_2$–$C_{13}$, carboxy, carboxyalkyl $C_2$–$C_8$, carboalkoxy $C_2$–$C_{14}$, or similar substituents).

Formula II:

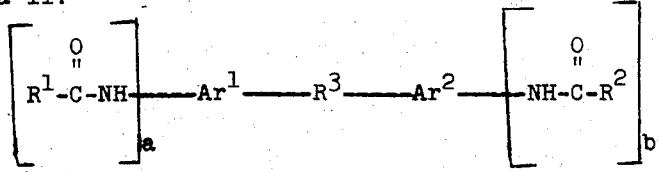

In Formula II, $a$ and $b$ are integers having values of for example from 1 to 4, the sum of $a$ and $b$ being from 2 to 8 (preferably 2). $R^1$ and $R^2$ may be the same or different and may have for example the values stated for R in Formula I above. $R^3$ is for example a single bond, or various connecting Moieties, ordinarily a bivalent hydrocarbon moiety, preferably aliphatic or cycloaliphatic, whether saturated or unsaturated, as for instance $C_1$–$C_8$ alkylene (e.g., methylene, ethylene, tetramethylene), $C_5$–$C_8$ cycloalkylene (e.g., cyclohexene), $C_2$–$C_8$ alkylidene (e.g., ethylidene, isopropylidene), and $C_2$–$C_8$ alkenylene (e.g., vinylene). $R^3$ may also be a suitable non-hydrocarbon moiety, for example —O—. $Ar^1$ and $Ar^2$ may be the same or different and may have for example the values assigned to Ar in Formula I.

Polyamides suitable for this process may be obtained by the acylation or aroylation of any primary aromatic polyamine even if the amine possesses one or more substituents that are easily reducible. If the aromatic polyamide contains an easily reducible group, the corresponding alicyclic polyamide will then contain that group in its reduced form. For example olefinic, ketone and aryl substituents in the starting aromatic polyamide are transformed into alkyl, alcohol and alicyclic substituents, respectively, in the alicyclic polyamide product.

Examples of aromatic polyamides useful in the invention include: 1,2-diacetamidobenzene, 1,3-diacetamidobenzene, 1,4-diacetamidobenzene, 2,4-diacetamidotoluene, 2,5-diacetamidotoluene, 2,6-diacetamidotoluene, 3,4-diacetamidotoluene, bis(4-acetamidophenyl)methane, 2,2'-diacetamidodiphenyl, 2,4'-diacetamidodiphenyl, 3,3-diacetamidodiphenyl, 4,4'-diacetamidodiphenyl, oxybis-4,4'-acetanilide, 4,4'-diacetamidodiphemylethane, 4,4'-diacetamido-3,3'-dimethyldiphenyl, 1,2-diacetamidonaphthalene, 1,5-diacetamidonaphthalene, 1,8-diacetamidonaphthalene, 2,3-diacetamidonaphthalene, 9,10-diacetamidophenanthrene, 4,5-diacetamidoacenaphthene, 2,3-diacetamidofluorene, 2,5-diacetamidofluorene, 2,7-diacetamidofluorene, 1,-2-diacetamido-4,5-dimethylbenzene, 1,2-diacetamido-4-methoxybenzene, 1,3-diacetamido-4-methoxybenzene, 4,4'-diacetamido-3,3'-dimethoxydiphenyl, 2,3-diacetamido-9-fluorenone, 1,3,5-triacetamidobenzene, 1,2,4-triacetamidobenzene, 1,2,4,5-tetracetamidobenzene, 2,4,6-triacetamidotoluene, 2,3,4-triacetamidotoluene, 2,4,5-triacetamidotoluene, 2,4,6-triacetamido-m-xylene, 2,4,6-triacetamidoanisole, 2,3-diacetamidobenzoic acid, 2,4-diacetamidobenzoic acid, 2,5-diacetamidobenzoic acid, 3,4-diacetamidobenzoic acid, 3,5-diacetamidobenzoic acid, methyl 3,5-diacetamidobenzoate, ethyl 2,3-diacetamidobenzoate, 2,2'-diacetamidobenzophenone, 3,3'-diacetamidobenzophenone, 4,4'-diacetamidobenzophenone, 3,3',4,4'-tetracetamidobenzophenone, bis(4-formamidophenyl)methane, bis(4-stearamidophenyl)-methane, 2,4-dibutyramidotoluene, 1,4-distearamidobenzene, 1,3-dibenzamidobenzene, 1,5-dipropionamidonaphthalene, 1,5-distearamidonaphthalene, and the like.

HYDROGENATION CATALYSTS

The catalysts employed for the nuclear hydrogenation of N-aryl polyamides in accordance with the invention are, as indicated, palladium, osmium, iridium, rhodium, ruthenium, nickel and cobalt, preferably rhodium, ruthenium, palladium, nickel and cobalt, most preferably rhodium and ruthenium. The catalysts may be prepared and used either unsupported or supported on a suitable carrier such as carbon, alumina, silica, silica-alumina, alkaline earth carbonates, alkaline earth sulfates, kieselguhr, zeolites, pumice, clay, cellulose, asbestos, etc. They may be prepared and used as powders for slurry reactions or as pellets, spheres or granules for fixed bed reactions.

THE HYDROGENATION PROCESS

The hydrogenation process may be carried out in the absence of any solvent medium, or in the presence of an inert organic solvent, including for example alcohols (e.g., aliphatic or cycloaliphatic alcohols, including alkanols and cycloalkanols), such as methyl alcohol ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, tert-amyl alcohol, n-hexyl alcohol, cyclohexanol, n-octyl alcohol, 2-ethylhexanol, n-decyl alcohol, n-dodecanol, n-tetradecanol, n-hexadecanol, n-octadecanol, ethylene glycol, propylene glycol, glycerol, etc.; ethers, such as diethyl ether, di-n-propyl ether, diisopropyl ether, methyl n-butyl ether, ethyl n-butyl ether, di-n-butyl ether, di-n-amyl ether, diisoamyl ether, di-n-hexyl ether, ethylene glycol dimethyl ether, ethylene glycol diethyl ether, ethylene glycol dibutyl ether, 1,3-dioxolane, 1,4-dioxane, tetrahydrofuran, etc.; alcohol-ethers, such as diethylene glycol, triethylene glycol, tetraethylene glycol, dipropylene glycol, 2-butoxyethanol, tetrahydrofurfuryl alcohol, etc.; esters, such as ethyl acetate, propyl acetate, isopropyl acetate, butyl acetate, isobutyl acetate, methyl amyl acetate, 2-ethylhexyl acetate, diethyl succinate, etc.; nitriles, such as acetonitrile, propionitrile, butyronitrile, etc.; amides, such as formamide, acetamide, propionamide, N,N-dimethylformamide, N,N-diethylformamide, N,N-dimethylacetamide, N,N-diethylacetamide, etc.; hydrocarbons, such as n-hexane, 2-methylpentane, 3-methylpentane, 2,2-dimethylbutane, 2,3-dimethylbutane, cyclohexane, n-heptane, 3-methylhexane, n-octane, 2,2,4-trimethylpentane, 2,3,4-trimethylpentane, n-decane, decalin, etc.

The hydrogenation may be run at temperatures ranging from room temperature or below (e.g., 5°C.) to over 200°C. (e.g., 250°C.) or other temperatures as high as the stability of the reactants and products will permit, and at pressures ranging from atmospheric pressure or below to pressures as high as economically practical (e.g., up to 10,000 psi). Preferred is a somewhat elevated pressure of for example 10 psi, up to for instance 5,000 psi, usually 100 to 2,500 psi. The conditions may be varied to provide an optimum economic combination of temperature, pressure, catalyst level, and cycle time for any given starting material or catalyst.

The hydrogenation reaction may be carried out in either batch or continuous systems with either tank or pipe-line or tubular reactors, operating in a manner well known to those skilled in the art.

ACID TREATMENT OF CATALYST

In accordance with a preferred practice of the invention it has been found that treatment of rhodium catalyst with an acid permits both increased activity and extensive reuse of the catalyst, with a resulting important decrease in cost. Thus, the activity of rhodium catalyst is markedly promoted by the addition of acid. Furthermore, repeated catalyst reuse is feasible when the spent catalyst is treated with acid. In the case of new catalyst, the acid treatment is most suitably accomplished in situ by adding a small amount of acid, effective to increase the activity of the catalyst, directly to the reaction mixture. For the purpose of reactivating or regenerating spent or used catalyst, the acid treatment is most conveniently effected by washing the recovered catalyst with acid, prior to reuse of the catalyst. The acid may be an inorganic acid (e.g., sulfuric, hydrochloric, phosphoric and nitric acid) or an organic acid (e.g., acetic, propionic, butyric, succinic and maleic acids). For the in situ treatment of fresh catalyst the acid may be added per se or as an appropriate solution of dilute acid, the inorganic acids being particularly suitable for this purpose. For the washing treatment of recycled catalyst, concentrated acids or dilute solutions of acid, whether inorganic or organic, are appropriate. Even a catalyst which has been completely poisoned in a previous run can be reactivated in this manner. Platinum catalyst, which is ordinarily inoperative in the described hydrogenation process, shows some activity when treated with acid.

USEFULNESS OF ACID TREATED CATALYST WITH MONOAMIDES

The described acid activation or reactivation of the catalyst is also applicable when the catalyst is used for other purposes, notably the nuclear hydrogenation of N-aryl monoamides to N-cycloaliphatic monoamides (e.g., conversion of formanilide to N-cyclohexylformamide, acetanilide to N-cyclohexylacetamide, etc.).

Thus, the acid-treated catalyst can be used to advantage for example in the nuclear hydrogenation of N-aryl amides of Formula I stated above where $n$ is equal to 1 and R and Ar are as previously defined. The reaction conditions, solvents, etc. may be as stated above for the polyamides. The starting monoamides may be variously substituted, with stable groups or with easily reducible groups, as disclosed above for the starting polyamides. The starting aromatic monoamides used with the acid-treated catalyst may be obtained by the acylation or aroylation of any primary aromatic monoamine. Such monoamides include, by way of non-limiting example, acetanilide, 2-methylacetanilide, 3-methylacetanilide, 4-methylacetanilide, 2-ethylacetanilide, 2,6-diethylacetanilide, 2,3-diethylacetanilide, 2,4-diethylacetanilide, 2,5-diethylacetanilide, 3,4-diethylacetanilide, 3,5-diethylacetanilide, 2,4,6-trimethylacetanilide, 4-propylacetanilide, 4-butylacetanilide, 2-acetamidobiphenyl, 4-acetamidobiphenyl, 5-acetamidoindane, 1-acetamidonaphthalene, 2-acetamidonaphthalene, 5-acetamidoacenaphthene, 1-acetamidoanthracene, 2-acetamidoanthracene, 6-acetamidochrysene, 2-acetamidocymene, 3-acetamidofluoranthene, 2-acetamidofluorene, 9-acetamidophenanthrene, 1-acetamidopyrene, 3-methoxyacetanilide, 2-ethoxyacetanilide, 4-ethoxyacetanilide, 4-propoxyacetanilide, 4-phenoxyacetanilide, 2-methoxy-5-methylacetanilide, 4-methoxy-2-methylacetanilide, 2,4-dimethoxyacetanilide, 2,5-dimethoxyacetanilide, 3,5-dimethoxyacetanilide, 3,4-diethoxyacetanilide, 3,4,5-trimethoxyacetanilide, 2,4,5-trimethoxyacetanilide, methyl 2-acetamidobenzoate, methyl 4-acetamidobenzoate, methyl 3-acetamidobenzoate, ethyl 4-acetamidobenzoate, ethyl 3-acetamidobenzoate, 4-acetamidophenylacetate, 2-acetamidoacetophenone 3-acetamidoacetophenone 4-acetamidoacetophenone, 1-acetamido-9-fluorenone, 2-acetamido-9-fluorenone, 2-acetamidobenzoic acid, 3-acetamidobenzoic acid, 4-acetamidobenzoic acid, 4-acetamido-3-methylbenzoic acid 2-acetamido-3-methylbenzoic acid, 2-acetamido-5-methylbenzoic acid, 3-acetamido-4-methylbenzoic acid, 4-acetamido-3-methylbenzoic acid, 4-acetamido-3,5-dimethylbenzoic acid, 3-acetamido-2-naphthoic acid, 4-acetamidophenylacetic acid, 5-acetamidoisophthalic acid, 3-acetamidophthalic acid, propionanilide, butyranilide, stearanilide, benzanilide, and the like.

WORKING EXAMPLES

The following examples will serve to illustrate the practice of the invention in more detail.

EXAMPLE 1

Hydrogenation of bis(4-acetamidophenyl)methane

A. A mixture of 70.5 grams (0.25 mole) of bis(4-acetamidophenyl)methane, 200 ml. of 2-propanol, and 5.6 grams of 5% Rh on carbon was added to a 600-ml. autoclave equipped with a stirrer, a thermocouple, a gas inlet valve and a gas vent valve. The vessel was sealed, purged first with nitrogen and then with hydrogen, and pressured with hydrogen to 1600 p.s.i.g. The autoclave was heated with agitation at 95°–110° while maintaining an effective pressure of 1600–1900 p.s.i.g. by further addition of hydrogen when necessary, for 1 hour, when gas absorption ceased. Agitation was continued for an additional 0.5 hour at 105°. The autoclave was cooled and depressurized. The reaction product was removed and filtered through diatomaceous earth filter aid to remove the catalyst. The solvent was removed in a rotary evaporator under reduced pressure. The residue consisted of 68.5 grams (93% yield) of white bis(4-acetamidocyclohexyl)methane, m.p. 207°–221°, and was shown by U.V. analysis to contain 0.12 gram (0.2% of amount charged) of aromatic starting material. The product, a mixture of isomers, was characterized by elemental analysis. Anal. Calcd. for $C_{17}H_{30}N_2O_2$: C, 69.35; H, 10.27; N, 9.51. Found: C, 69.10; H, 10.31; N, 9.76. The trans-trans isomer, m.p. 271°–273°, and the cis-trans isomer, m.p. 231°–232°, were isolated by fractional crystallization from 2-propanol.

B. A mixture of 8.5 grams (0.030 mole) of bis(4-acetamidophenyl) methane, 150 ml. of 2-propanol, and 4.8 grams of 5% Rh on carbon was added to a shaker type low pressure reaction apparatus (Parr Instrument Co., series 3910). The vessel was sealed, purged first with nitrogen and then with hydrogen, and pressured with hydrogen to 50 p.s.i.g. The reaction mixture was agitated for 18 hours at room temperature. The apparatus was depressurized and the reaction product removed and filtered through diatomaceous earth filter aid to remove the catalyst. The solvent was removed in a rotary evaporator under reduced pressure. The residue consisted of 8.5 grams (96% yield) of white bis(4-acetamidocyclohexyl)methane, m.p. 208°–228°, and was shown by U.V. analysis to contain 0.1% aromatic starting material.

C. A mixture of 16.94 grams (0.060 mole) of bis-(4-acetamidophenyl)methane, 220 ml. of 2-propanol, and 4.8 grams of 5% Rh on carbon was added to a 600-ml. autoclave as described above. The vessel was sealed, purged first with nitrogen and then with hydrogen, and pressured with hydrogen to 1050 p.s.i.g. The autoclave was agitated at 15°–18° and 890–1050 p.s.i.g. for 4.7 hours at which point the gas absorption was about 50% of the theoretical amount required for the hydrogenation of bis-(4-acetamidophenyl) methane to bis(4-acetamidocyclohexyl)-methane. The autoclave was depressurized and the reaction product removed and filtered through diatomaceous earth filter aid to remove the catalyst. The solvent was removed in a rotary evaporator under reduced pressure. The residue consisted of 16.6 grams that had a U.V. absorption maximum in methanol at 251 m$\mu$, identical with that of the starting material, bis(4-acetamidophenyl)methane. Thin layer chromatography (TLC) of the residue on silica gel with benzene-methanol (4:1) gave two spots. One, detected by acid charring (5% potassium dichromate in 40% sulfuric acid), had the same $R_f$ value as bis(4-acetamidocyclohexyl)methane. The other, detected by fluorescent quenching as well as by acid charring, had the same $R_f$ value as bis(4-acetamidophenyl)methane. There was no indication of the presence of 4-acetamidocyclohexyl-4-acetamidophenylmethane from either U.V. or TLC analyses.

D. The results of a series of experiments run in a 300-ml. autoclave with 8.47 grams (0.03 mole) of bis-(4-acetamidophenyl)methane and 110 ml. of 2-propanol with various catalysts are summarized in Table I. The content of aromatic material in the products reported in Table I was, in all cases except Expts. Nos 5 and 8, determined by U.V. analysis based on the starting material; one equivalent of 4-acetamidocyclohexyl-4-acetamidophenylmethane would be calculated as 0.5 mole of bis(4-acetamidophenyl)methane. In Expts. Nos. 5 and 8 the aromatic content of the product was determined by gas absorption. The data in Table I clearly indicate that the nuclear hydrogenations of the polyamide carried out with rhodium, palladium, ruthenium, nickel and cobalt catalysts resulted in essentially complete hydrogenation of the aromatic ring (Experiments 1 through 7, 9 and 10). Experiment 8, which is outside the invention, shows that platinum, the catalyst most widely used in the industry for the hydrogenation of aromatic rings, is essentially ineffective. The operability of the invention is particularly suprising in view of this.

E. Experiment D-3, which took 5 hours to go to completion, was run with bis(4-acetamidophenyl)methane that had been prepared from practical grade 4,4'-methylenedianiline. This experiment was repeated with bis(4-acetamidophenyl)methane that had been prepared from distilled 4,4'-methylenedianiline, and also with this last bis(4-acetamidophenyl)methane that had been further purified by one recrystallization from methanol-water. The reaction times were 3.5 hours and 1.75 hours, respectively.

B.

bisacetamidobenzene, 250 ml. of 2-propanol, and 5.5 grams of 5% Rh on carbon was added to a 600 ml. autoclave. The vessel was sealed, purged first with nitrogen and then with hydrogen, and pressured with hydrogen to 1000 p.s.i.g. The reaction mixture was heated with agitation at 20°–60° and 900–1200 p.s.i.g. for 0.7 hour when gas absorption ceased. Agitation was continued for an additional 1.5 hours at 60°. The autoclave was cooled and depressurized. The reaction product was removed and filtered through a filter aid to remove the catalyst. The solvent was removed in a rotary evaporator under vacuum. the residue consisted of 19.2 grams (97% yield) of white N,N'-1,3-cyclohexylenebisacetamide, m.p. 237°–251°, and was shown by U.V. analysis to contain no aromaticity. This mixture of isomers was characterized by elemental analysis. Anal. Calcd. for $C_{10}H_{18}N_2O_2$: C, 60.56; H, 9.18; N, 14.12. Found: C, 60.73; H, 9.21; N, 13.86.

EXAMPLE 3

Hydrogenation of 1,4-bisacetamidobenzene

A mixture of 19.2 grams (0.10 mole) of 1,4-bisacetamidobenzene, 250 ml. of 2-propanol, and 5.5 grams of 5% Rh on carbon was added to a 600-ml. autoclave. The vessel was sealed, purged first with nitrogen and then with hydrogen, and pressured with hydrogen to 1000 p.s.i.g. The autoclave was heated with agitation at 900–1200 p.s.i.g. for 2 hours at 35°–40°, followed by 2.2 hours at 50°–60° when gas absorption ceased. Agitation was continued for an additional 1 hour at 50°–55°. The autoclave was cooled and depressurized. The reaction product was removed and filtered through a filter aid to remove the catalyst. The solvent was removed in a rotary evaporator under vacuum. The residue consisted of 18.6 grams (94% yield) of white N,N'-1,4-cyclohexylenebisacetamide, m.p. 203°–243°, and was shown by U.V. analysis to contain no aromaticity. This mixture of isomers was characterized by elemental analysis. Anal. Calcd. for $C_{10}H_{18}N_2O_2$: C, 60.56; H, 9.18; N, 14.12. Found: C, 60.63; H, 9.22; N, 14.05.

Table 1

Nuclear Hydrogenation of Bis(4-acetamidophenyl)methane

| Expt. No. | Catalyst type | wt., g. | conc., g/l. | Temp., °C. | Pressure, p.s.i.g. | Time, hrs. | Residue product m/p.°C. | % aromatic |
|---|---|---|---|---|---|---|---|---|
| 1 | 5% Rh/C | 2.4 | 20 | 20–25 | 900–1200 | 4.3 | 209–230 | 0.2 |
| 2 | 5% Rh/C | 2.4 | 20 | 60–65 | 900–1200 | 0.25 | — | — |
| 3 | 5% Rh/C | 0.60 | 5.0 | 65–70 | 900–1200 | 5.0 | 206–211 | 0 |
| 4 | 5% Rh/C | 0.60 | 5.0 | 50–125 | 900–1020 | 0.70 | 192–215 | 1.4 |
| 5 | 5% Rh/C | 0.12 | 1.0 | 170–220 | ca.1130–1340 | 2.6 | 64–134 | ca.50 |
| 6 | 5% Ru/C | 2.4 | 20 | 80 | 900–1200 | 4.5 | 203–233 | 0.6 |
| 7 | 5% Pd/C | 2.4 | 20 | 150–155 | 900–1200 | 7.0 | 203—243 | 1.6 |
| 8 | 5% Pt/C | 2.4 | 20 | 195–200 | 1400–1450 | 0.8 | — | ca.100 |
| 9 | 50% Ni/k | 2.4 | 20 | 200 | 900–1240 | 8.5 | waxy | 0.8 |
| 10 | 61% Co/k | 2.4 | 20 | 200 | 900–1300 | 7.3 | waxy | 0.9 |

F. Hydrolysis of bis(4-acetamidocyclohexyl)methane

A mixture of 4.4 grams (0.015 mole, 0.030 equiv.) of bis(4-acetamidocyclohexyl)methane and 50 ml. of 6N sulfuric acid was refluxed for periods of 6, 12 and 19 hours. The extent of hydrolysis was shown to be a minimum of 80, 90 and 97%, respectively, by steam distillation and subsequent titration of the acetic acid formed.

EXAMPLE 2

Hydrogenation of 1,3-bisacetamidobenzene

A mixture of 19.2 grams (0.10 mole) of 1,3-

EXAMPLE 4

Hydrogenation of 2,4-bisacetamidotoluene

A mixture of 8.2 grams (0.040 mole) of 2,4-bisacetamidotoluene, 250 ml. of 2-propanol, and 5.5 grams of 5% Rh on carbon was added to a 600-ml. autoclave. The vessel was sealed, purged first with nitrogen and then with hydrogen, and pressured with hydrogen to 1000 p.s.i.g. The atuoclave was heated with agitation at 25°–60° and 900–1000 p.s.i.g. for 0.7 hour, followed by an additional 1 hour at 60°–65° with little or no gas absorption. The autoclave was cooled and depressurized. The reaction product was removed and filtered through a filter aid to remove the catalyst. The solvent was removed in a rotary evaporator under vacuum. The residue consisted of 7.0 grams (83% yield) of white N,N'-1,3-(4-methylcyclohexylene)-bisacetamide, m.p. 198°–212°, and was shown by U.V. analysis to contain 0.3% of aromatic starting amide. Anal. Calcd. for $C_{11}H_{20}N_2O_2$: C, 62.06; H, 9.54; N, 13.26. Found: C, 62.03; H, 9.31; N, 13.20.

EXAMPLE 5

Hydrogenation of 1,5-bisacetamidonaphthalene

A mixture of 12.0 grams (0.0496 mole) of 1,5-bisacetamidonaphthalene, 250 ml. of 2-propanol, and 4.0 grams of 5% Rh on carbon was added to a 600-ml. autoclave. The vessel was sealed, purged first with nitrogen and then with hydrogen, and pressured with hydrogen to 1000 p.s.i.g. The autoclave was heated with agitation at 75° and 900–1200 p.s.i.g. for 1.8 hours, followed by 6.5 hours at 95° and 1140–1180 p.s.i.g. with little or no gas absorption in the last 3 hours. The autoclave was cooled and depressurized. The reaction product was removed and filtered through a filter aid to remove the catalyst. The solvent was removed in a rotary evaporator under vacuum. The residue consisted of 10.7 grams (85% yield) of white 1,5-bisacetamidodecalin, m.p. 250°–270° (with dec.), and was shown by U.V. analysis to contain no aromaticity. Anal. $C_{for\ c14}H_{24}N_2O_2$: C, 66.63; H, 9.59; N, 11.10. Found: C, 66.25; H, 9.78; N, 10.88.

EXAMPLE 6

Hydrogenation of bis(4-acetamidophenyl)methane

A mixture of 282 grams (1.0 mole) of bis(4-acetamidophenyl)methane, 870 ml. of 2-propanol, and 11 grams of 5% Rh on carbon was added to a 1-gallon stirred autoclave. The vessel was sealed, purged first with nitrogen and then with hydrogen, and pressured with hydrogen to 900 p.s.i.g. The autoclave was heated with agitation at 120° and 800–1000 p.s.i.g. for 5.3 hours with little or no gas absorption in the last 0.8 hour. The autoclave was cooled and depressurized. The reaction product was removed using a large volume of methanol to wash all material out of the vessel. The catalyst was separated by centrifugation, washed with a large volume of methanol and then with about 200 ml. of water. After a final centrifugation, the catalyst past was divided into equal portions each containing 1.1 grams of 5% Rh on carbon on a dry basis. Each portion was then washed with two 200-ml. volumes of 2-propanol and then used in example 7.

EXAMPLE 7

Reactivation of used catalyst in hydrogenation of bis(4-acetamidophenyl)methane

Each experiment was run in a 300-ml. autoclave with 28.2 grams (0.10 mole) of bis(4-acetamidophenyl)methane, 87 ml. of 2-propanol, and 1.1 grams of 5% Rh on carbon at 120° and 800–1000 p.s.i.g. The samples of used and 2-propanol washed catalyst from Example 6 were each treated with 200-ml. of an acid solution as indicated in Table II. The spent catalyst portions were thoroughly stirred in the respective acid solutions and centrifuged. After decanting the liquid phase the acid solution treatment was repeated, and then the solid catalyst portions were each washed twice in 200 ml. of 2-propanol. The results are summarized in Table II, where Expt. A shows the effectiveness of fresh catalyst, B represents the used, 2-propanol washed catalyst of Example 6, Expts. C through F indicate the efficacy of the acid treated catalyst of Example 6, and Expt. G and H demonstrate that even for repeated use of spent catalyst (of F and G respectively), the acid treatment is most beneficial. The time reported in Table II is the time required at the reaction temperature to reach complete nuclear hydrogenation (except in Expt. B which achieved 90% completion as determined by gas absorption). In Expt. A the time given is the average of two runs.

Table II

| Expt. No. | Reactivation of Used Rhodium Catalyst | | |
|---|---|---|---|
| | Wash Medium | Time, hrs. | Comments |
| A | None | 2.7 ± 0.2 | Base run with fresh catalyst. |
| B | 2-propanol | 5.8 | ca. 90% complete |
| C | 6N aq. acetic acid | 4.1 | |
| D | 6N aq. $H_3PO_4$ | 2.2 | |
| E | 6N aq. HCl | 4.3 | |
| F | 6N aq. $H_2SO_4$ | 3.8 | |
| G | 6N aq. $H_2SO_4$ | 4.1 | Used catalyst from expt. F. |
| H | 6N aq. $H_2SO_4$ | 1.8 | Used catalyst from expt. G. |

EXAMPLE 8

Acid-promotion of rhodium catalyst in hydrogenation of bis(4-acetamidophenyl)-methane Each experiment was run in a 300-ml. autoclave with 28.2 grams (0.10 mole) of bis(4-acetamidophenyl)-methane, 87 ml. of 2-propanol, and 1.1 grams of fresh 5% Rh on carbon at 120° and 800–1000 p.s.i.g. The results are summarized in Table III. The time reported in Table III is the time required at the reaction temperature to reach complete nuclear hydrogenation (average of two runs in Expt. A and C).

Table III

| Expt. No. | Acid-Promotion of Fresh Rhodium Catalyst | | | | Time, Hrs. |
|---|---|---|---|---|---|
| | Type | Quantity | Mole | Equiv. | |
| A | None | — | — | — | 2.7 ± 0.2 |
| B | 6N $H_2SO_4$ | 0.20 ml. | $6 \times 10^{-4}$ | $12 \times 10^{-4}$ | 1.8 |
| C | 6N $H_2SO_4$ | 0.10 ml. | $3 \times 10^{-4}$ | $6 \times 10^{-4}$ | 1.8 ± 0.1 |
| D | 6N HCl | 0.10 ml. | $6 \times 10^{-4}$ | $6 \times 10^{-4}$ | 1.3 |
| E | 6N $H_3PO_4$ | 0.10 ml. | $2 \times 10^{-4}$ | $6 \times 10^{-4}$ | 1.2 |

EXAMPLE 9

Additional catalyst reuse experiments in hydrogenation of bis(4-acetamidophenyl)-methane A. The catalyst from Example 7 H (see Table II) was washed with methanol and then with two 200-ml. portions of 2-propanol. An attempt to reuse the catalyst under the conditions of Example 7 resulted in about 90% conversion after over 6 hours. B. The spent catalyst from Example 9 A was washed with methanol, two 200-ml. portions of 6N $H_2SO_4$, and one 200-ml. portion of 2-propanol. Example 7 was then repeated after the addition of 0.10 ml. of 6N $H_2SO_4$ and resulted in complete conversion in 3.5 hours.

EXAMPLE 10

Catalyst promotion and reuse in hydrogenation of 2,4-bisacetamidotoluene to N,N'-1,3-(4-methylcyclohexylene)bisacetamide Each experiment was run in a 300-ml. autoclave with 10.3 grams (0.05 mole) of 2,4-bisacetamidotoluene, 106 ml. of 2-propanol, and 1.1 grams of 5% Rh on carbon at 120° and 800–1000 p.s.i.g.

A. The experiment with fresh catalyst was completed in 2.3 ± 0.3 hours (average of 2 runs).

B. A repetition of Example 10 A with the addition of 0.10 ml. of 6N $H_2SO_4$ resulted in complete conversion in 1.2 hours.

C. The used catalyst from one of the experiments in Example 10 A was washed with methanol and then two 200-ml. portions of 2-propanol. A repetition of Example 10 A with this catalyst resulted in about 90% conversion in 7.5 hours.

D. The used catalyst from Example 10 C was washed with methanol, two 200-ml. portions of 6N $H_2SO_4$, and one 200-ml. portion of 2-propanol. A repetition of Example 10 A with this catalyst after the addition of 0.10 ml. of 6N $H_2SO_4$ resulted in complete conversion in 2.8 hours.

EXAMPLE 11

Rhodium-catalyzed nuclear hydrogenation of acetanilide

A. (Control example outside the invention).

A mixture of 27.0 grams (0.20 mole) of acetanilide, 90 ml. of 2-propanol, and 0.10 gram of 5% Rh on carbon was added to a 300-ml. autoclave. The vessel was sealed, purged first with nitrogen and then with hydrogen, and pressured with hydrogen to 900 p.s.i.g. The autoclave was heated with agitation at 100° and 800–1000 p.s.i.g., and the reaction was completed in 1.9 hours.

B. Example A was repeated with the addition of 0.10 ml. ($3 \times 10^{-4}$ mole) of 6N $H_2SO_4$ to the reaction mixture. The reaction was completed in 1.0 hours.

C. (Control example outside the invention.)

Example A was repeated with the used catalyst from Example A after it had been separated from the reaction product by centrifugation and then washed with one 400-ml. portion of 2-propanol followed by washings with two 200-ml. portions of 2-propanol. The reaction with this catalyst was completed in 6.8 hours.

D. The used catalyst from Example C was separated from the reaction product by centrifugation, washed with one 400-ml. portion followed by two 200-ml. portions of 2-propanol, washed once with 200-ml. of 6N $H_2SO_4$, and then twice with 200-ml. portions of 2-propanol. When Example B was repeated with this recovered and acid-treated catalyst from Example C, the reaction was completed in 3.8 hours.

EXAMPLE 12

Rhodium-catalyzed nuclear hydrogenation of butyranilide

A. A mixture of 16.3 grams (0.10 mole) of butyranilide, 105 ml. of 2-propanol, and 0.10 gram of 5% Rh on carbon was added to a 300-ml. autoclave. The vessel was sealed, purged first with nitrogen and then with hydrogen, and pressured with hydrogen to 900 p.s.i.g. The autoclave was heated with agitation at 75° and 800–1000 p.s.i.g., and the reaction was completed in 1.3 hours.

B. Example A was repeated with the addition of 0.10 ml. ($3 \times 10^{-4}$ mole) of 6N $H_2SO_4$ to the reaction mixture. The reaction was completed in 0.8 hour.

EXAMPLE 13

Activation of platinum catalyst with acid

This example demonstrates the fact that platinum, which is ordinarily ineffective as a catalyst for nuclear hydrogenation of N-aryl amides, shows some activity for this purpose when treated with acid.

Bis(4-acetamidophenyl)methane is hydrogenated using 5% platinum on carbon, according to the procedure of Example 1, part D, Table I, Experiment No. 8, except that 2 drops of 6N hydrochloric acid is added to the reaction mixture. The reaction temperature is 190°–200°, pressure 1340–1380 p.s.i.g., reaction time 0.8 hour. The product obtained melts at 190°–205° and has an aromatic content of 75%.

Having thus described our invention, what we claim and desire to protect by Letters Patent is:

1. A method for nuclear hydrogenation of an N-aryl polyamide to an N-alicyclic polyamide comprising contacting the N-aryl polyamide with hydrogen in the prrsence of an acid-treated rhodium hydrogenation catalst at a temperature of from 5° to 250°C. and at a pressure within the range of from atmospheric pressure to 10,000 psig, the said N-aryl polyamide being selected from the group consisting of those of Formulas I and II as follows:

Formula I:

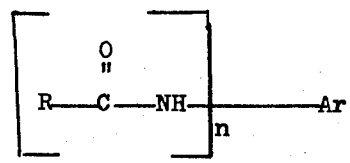

where $n$ is an integer from 2 to 4; R is selected from the group consisting of hydrogen, alkyl of from 1 to 17 carbon atoms, cycloalkyl of from 5 to 8 carbon atoms, aryl of from 6 to 10 carbon atoms, aralkyl of from 7 to 14 carbon atoms, and alkaryl of from 7 to 14 carbon atoms; and Ar is an aromatic moiety of phenyl, naphthyl fluoroenyl, diphenyl, phenanthryl, or acenaphthyl origin; and Formula II:

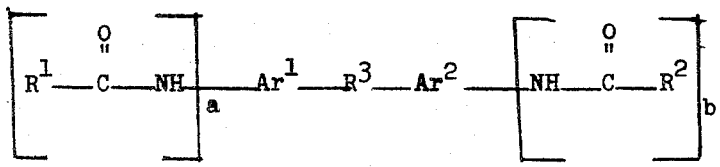

where $a$ and $b$ are integers having values of from 1 to 4, the sum of $a$ and $b$ being from 2 to 8; $R^1$ and $R^2$ are the same or different and have values as stated for R in Formula I above; $R^3$ is selected from the group consisting of a single bond, $C_1$—$C_8$ alkylene, $C_5$—$C_8$ cycloalkylene, $C_2$—$C_8$ alkylidene, $C_2$—$C_8$ alkenylene, and —O—; and $Ar^1$ and $Ar^2$ are the same or different and have values as stated above for Ar.

2. A method as in claim 1 in which the acid treatment of the hydrogenation catalyst is carried out in situ in the hydrogenation reaction mixture by adding the acid to said reaction mixture in amount effective to increase the activity of the catalyst.

3. A method as in claim 2 in which the catalyst which is acid treated is fresh catalyst which has not previously been used in the hydrogenation process.

4. A method as in claim 2 in which the catalyst which is acid treated is a spent catalyst recovered from a previous run of the hydrogenation process whereby the catalyst is re-activated by said acid treatment.

5. A method as in claim 1 in which the acid treatment of the hydrogenation catalyst is carried out outside the hydrogenation mixture by contacting the catalyst with acid.

6. A method as in claim 5 in which the catalyst which is acid treated is fresh catalyst which has not previously been used in the hydrogenation process.

7. A method as in claim 5 in which the catalyst which is acid treated is a spent catalyst recovered from a previous run of the hydrogenation process whereby the catalyst is re-activated by said acid treatment.

8. A method as in claim 3 in which the said N-aryl polyamide is bis(4-acetamidophenyl)methane.

9. In a method of hydrogenating bis(4-acetamidophenyl)methane to bis(4-acetamidocyclohexyl) methane by contacting bis(4-acetamidophenyl)methane with hydrogen and rhodium catalyst, the improvement comprising recovering the spent catalyst from the reaction mixture at the conclusion of the hydrogenation, thereafter washing the recovered catalyst with acid whereby the catalyst is reactivated with respect to its ability to catalyze the hydrogenation of bis(4-acetamidophenyl)methane, and subsequently re-using the thus reactivated catalyst in another run of said hydrogenation, the hydrogenation being carried out at a temperature of from 50° to 250°C. and at a pressure within the range of from 10 to 5000 psig.

* * * * *